(12) United States Patent
Bhalekar et al.

(10) Patent No.: US 11,406,910 B2
(45) Date of Patent: Aug. 9, 2022

(54) APPARATUS FOR MAXIMIZING EFFLUENT LIQUID EVAPORATION

(71) Applicants: PADMINI VNA MECHATRONICS PVT. LTD., Gurgaon (IN); QUADSUN SOLAR PRIVATE LIMITED, Gurgaon (IN)

(72) Inventors: Prakash Bhalekar, Gurgaon (IN); Shailesh Bishnoi, Gurgaon (IN); Puneet Saini, Gurgaon (IN)

(73) Assignee: PADMINI VNA MECHATRONICS PVT. LTD., Gurgaon (IN)

( * ) Notice: Subject to any disclaimer, the term of this patent is extended or adjusted under 35 U.S.C. 154(b) by 0 days.

(21) Appl. No.: 17/042,257

(22) PCT Filed: May 24, 2019

(86) PCT No.: PCT/IB2019/054333
§ 371 (c)(1),
(2) Date: Sep. 28, 2020

(87) PCT Pub. No.: WO2019/224795
PCT Pub. Date: Nov. 28, 2019

(65) Prior Publication Data
US 2021/0060452 A1  Mar. 4, 2021

(30) Foreign Application Priority Data
May 24, 2018  (IN) .............. 201811019498

(51) Int. Cl.
*B01D 1/20* (2006.01)
*B01D 1/00* (2006.01)
*B01D 1/30* (2006.01)
*C02F 1/00* (2006.01)
(Continued)

(52) U.S. Cl.
CPC ......... *B01D 1/0082* (2013.01); *B01D 1/0064* (2013.01); *B01D 1/20* (2013.01); *B01D 1/305* (2013.01); *C02F 1/008* (2013.01); *C02F 1/048* (2013.01); *C02F 1/12* (2013.01); *C02F 2209/008* (2013.01); *C02F 2209/02* (2013.01); *C02F 2209/38* (2013.01)

(58) Field of Classification Search
CPC ...... B01D 1/0064; B01D 1/0082; B01D 1/20; B01D 1/305; C02F 1/008; C02F 1/048; C02F 1/12; C02F 2209/008; C02F 2209/02; C02F 2209/38
See application file for complete search history.

(56) References Cited

U.S. PATENT DOCUMENTS

| | | | |
|---|---|---|---|
| 4,363,703 A * | 12/1982 | ElDifrawi | F24S 10/20 203/10 |
| 4,449,849 A | 5/1984 | Horn et al. | |
| 5,082,525 A | 1/1992 | Travis | |

(Continued)

*Primary Examiner* — Jonathan Miller

(57) ABSTRACT

The present invention generally relates to a system for treating effluent water. More particularly, it provides a robust apparatus for treating waste liquid by optimizing solar and wind energy to maximize the evaporation rate as compare to natural evaporation rate. The main object of the present invention is to provide a system for evaporating RO reject and other effluent liquid and other liquids, by optimizing system to solar and wind energy to maximize vaporization rate and recovery rate at marginal operational cost.

27 Claims, 16 Drawing Sheets

(51) Int. Cl.
*C02F 1/04* (2006.01)
*C02F 1/12* (2006.01)

(56) References Cited

U.S. PATENT DOCUMENTS

| | | | |
|---|---|---|---|
| 5,094,721 A * | 3/1992 | Petrek | B01D 1/26 |
| | | | 159/18 |
| 7,448,600 B1 | 11/2008 | Boulter | |
| 9,593,025 B2 * | 3/2017 | Clark | B01D 1/22 |
| 9,808,738 B2 * | 11/2017 | Duesel, Jr. | F23G 7/085 |
| 10,442,702 B2 * | 10/2019 | Patey | C02F 1/14 |
| 10,556,809 B2 * | 2/2020 | Patey | B01D 1/26 |
| 10,562,789 B2 * | 2/2020 | Patey | B01D 1/0035 |
| 10,562,790 B2 * | 2/2020 | Patey | B01D 1/0047 |
| 10,898,826 B2 * | 1/2021 | Shiner | B01D 1/305 |
| 2007/0235146 A1 | 10/2007 | Haslem et al. | |
| 2014/0014277 A1 * | 1/2014 | Clark | B01D 1/0088 |
| | | | 159/16.1 |
| 2016/0362307 A1 * | 12/2016 | Shiner | B01D 1/305 |
| 2019/0299114 A1 * | 10/2019 | Shiner | B01D 1/16 |

* cited by examiner

| Amb Temp (C) | Amb Humidity (%) | Effluent Temp (C) | Electrical Power (KWHr/day) | Steam Consumed (kg/day) | System Evaporation (decaliter/day) | Steam Ratio |
|---|---|---|---|---|---|---|
| 16 | 45 | 60 | 28 | 253.8 | 250 | 9.85 |
| 17 | 40 | 60 | 28 | 367.2 | 370 | 10.08 |
| 18 | 55 | 45 | 28 | 105.9 | 170 | 16.05 |
| 16 | 42 | 50 | 28 | 235.4 | 300 | 12.75 |
| 30 | 60 | 50 | 28 | 161.5 | 350 | 21.67 |
| 30 | 70 | 60 | 28 | 186.9 | 270 | 14.44 |

APPARATUS FOR MAXIMIZING EFFLUENT LIQUID EVAPORATION

FIELD OF THE INVENTION

The present invention generally relates to a system for treating effluent water. More particularly, it provides a robust apparatus for treating waste liquid by optimizing energy and wind to maximize the evaporation rate as compared to natural evaporation rate.

BACKGROUND OF THE INVENTION

Waste liquid or polluted liquid is liquid that has been adversely affected in quality by anthropogenic influence or activity. Such influence or activity is specifically localized to liquid waste discharged by domestic residences, commercial properties, industry, and/or agriculture. These liquid waste discharges encompass a wide range of potential contaminants and concentrates which may include oils, greases, fats, heavy metals, dirt, and heavy particles.

However, with growing awareness among people and strict governmental control, there are norms in place to control the discharge of waste or polluted water. There are various stages of filtration which include primary treatment, secondary treatment and tertiary treatment. Primary treatment involves removal of organic and inorganic solids by sedimentation, and the removal of materials that float (scum) by skimming, secondary treatment is further treatment of the effluent from primary treatment to remove the residual organics and suspended solids and tertiary and/or advanced waste liquid treatment is to improve overall properties of liquid and make it usable for various applications.

Water treatment is a particular challenge in developing countries, where there may be shortages of liquid and widespread consumption of untreated water leading to disease. Energy for heating of liquid may not be readily available. The use of solar energy for treatment of grey liquid or sewerage is a means by which liquid can be treated in developing and developed countries alike. In such solar energy liquid treatment system, principle of evaporation process have been incorporated, with further underlying principle of providing heat from solar panels and condensing steam to a solution at a lower temperature across a metallic heat transfer surface. The absorbed heat causes vaporization of the effluent, usually water, and an increase in the solute concentration. The resulting vapor may be vented to the atmosphere, or condensed for reuse.

Theoretically, the process is simple and setting up an apparatus is also relatively less cumbersome, however the state of the art finds challenges while combining and optimizing different processes and components that shall ultimately reduce capital, operation cost and provide enhanced rate of filtration.

U.S. Pat. No. 4,449,849 discloses oil drilling waste liquid evaporator using a land based pump to spray via nozzles the liquid all around the edge of the reservoir back into the reservoir. A float can support a splash plate to increase the rate of evaporation from the land based nozzle. The evaporator is dependent on conventional source of energy and is economically less viable.

U.S. Pat. No. 7,448,600 provides a floating device that supports over a dozen high speed atomizing fans. The floating device is tethered from the sides of the reservoir or anchored in the reservoir. Power (preferably hydraulic) is supplied from a land based power unit. This hydraulic fluid also is used to transport the land based engine cooling heat out to the unit. Another heat exchanger on the land based power unit removes the heat from the coolant and adds it to the oil coming back from the return lines before it goes to the storage tank. The system is complex wherein plurality of heat exchangers and transfer of heat for ultimate dissipation is required. This too is based on conventional sources of energy.

U.S. Pat. No. 5,082,525 provides an improved method and apparatus rendering water-based fluid waste stream evaporation operations environmentally and otherwise safe, involving separately and independently existing the hot gas stream produced by fuel combustion and the vaporized fluid-air exhaust stream resulting from heat vaporizing of the fluid, independently directing the streams in opposite directions toward one another and to a common region, and applying fan suction immediately at said region to exert the sole control of withdrawing the streams simultaneously.

However, there are several drawbacks in the current existing solutions, for example U.S. Pat. Nos. 4,449,849 and 7,448,600 include a heavy buoyant raft confined to the width of a trailer. Another problem is the uncontrollable direction of the evaporative cloud which can contaminate nearby equipment. Also no droplet size control exists for varying humidity and wind conditions. Thus there is a need of a system which operates efficiently and in control manner.

Further U.S. Pat. No. 5,082,525 have very high systems and operational cost, i.e. treatment cost, as liquid to gas converters that are specifically employed for the reduction of substantial volumes of liquid have high power consumption associated to it.

Therefore, there is a technical gap in the area of treatment of effluent water wherein combining and optimizing different processes and components shall ultimately reduce capital and operation cost with high rate of recovery.

OBJECT OF THE INVENTION

The main object of the present invention is to provide a system for evaporating wastewater like but not limited to an RO reject, other effluents and other liquids, by optimizing an evaporator system to maximize vaporization rate and recovery rate at a marginal operational cost.

Yet another object of the present invention is to provide a compact, self-contained system for treating waste liquid and other liquids, wherein the system is usable as a primary, secondary and tertiary treatment unit.

Yet another object of the present invention is to provide a closed system able to adjust the whole functioning of system in real time depending upon conditions such as ambient temperature, ambient humidity, effluent temperature etc.

Yet another object of the present invention is maximum utilization of the ambient heat by increasing water-air contact area and high wind velocity.

Yet another object of the present invention is to maintain the high wind speed uniformly over the treatment zone with level control system and with minimum electrical energy consumption.

SUMMARY OF THE INVENTION

The present invention provides an automated, self contained system for treatment of waste liquid like but not limited to an RO reject, and other effluent liquids, by utilizing industrial waste-energy or renewable energy, like solar and wind energy, to maximize the evaporation rate as compared to natural evaporation rate, and further provides an integrated electric control unit to adjust the whole functioning of system in real time depending upon conditions such as ambient temperature, ambient humidity, effluent temperature etc. The automated self contained system increases the evaporation rate by 25-30 times natural rate and minimize the capital cost and treatment/operational cost. The system is compact and closed utilizing evaporation principle.

In the main embodiment of the present invention, an apparatus for maximizing liquid evaporation is provided. The apparatus comprises a plurality of modules which include but not limited to a housing with a rear duct and a fan duct, at least one effluent holding tank with or without a heat exchanger, a plurality of pans stacked one above another to increase the overall capacity of an apparatus, said stack of pans positioned between the rear duct and the fan duct, a multi-point injection system with optimized injection nozzles for supplying with controlled and uniform amount of the effluent liquid to said plurality of pans from the effluent holding tank, at least one mist separator, a control panel and an effluent management system. The heat exchanger is provided in effluent tank to raise the temperature of effluent. The fan duct contains at least one fan preferably a high CFM fan to blow, and facilitate circulation of normal or temperature controlled air over the surface of pans. The pans are supplied with a controlled amount of the effluent liquid from the effluent holding tank so as to facilitate accelerated evaporation. In addition, the pans have a top cover with plurality of means to divert the air on to the surface of the effluent liquid to expedite the forced vaporization and the overall process of treatment. Said plurality of pans are rolled off for maintenance purpose. The mist separator is installed before the fan duct to prevent any small water particles from escaping to atmosphere. The plurality of pans are increased or decreased to enlarge or contract the overall apparatus.

The control panel further has a plurality of sensors connected to it to monitor a plurality of variables, with help of a programmable processor. The control panel ensures a high rate of evaporation by feeding a calculated quantity of liquid inside pan, the calculation is based on variables like but not limited to effluent temperature, ambient air temperature and ambient humidity. The multi point injection system consists of an injection line, overflow line, an optional flush line and an optional level balance line and an optional secondary air heater to raise temperature of ambient air drawn into the system.

In another embodiment of the present invention, various arrangements of the plurality of pans are possible including but not limited to:
a single stack arrangement with a plurality of pans and each pan lying on the other with an optimized gap in between or held in a fixture to maintain the gap between them;
a plurality of stacks with each stack having a plurality of pans and each pan lying on the other or separated by fixing into a fixture, with an optimized gap in between. The stacks are arranged in a row, sharing the injection system and fan duct(s); or
a plurality of stacks with each stack having a plurality of pans and each pan lying on the other with an optimized gap in between. The stacks are arranged in a row such that the rows of pan in one stack are at staggered position with respect to the rows of pans in next stack.

More particularly, a pan is positioned at a level between two pans of stack adjacent to it. By this way, the dry air from one pan reaches surface of pan in an adjacent stack thus maximizing the evaporation rate.

In another embodiment of the present invention, various arrangements of the fan duct are possible like but not limited to a large fan duct having a single or multiple fans arranged in a panel, or an individual fan duct with one or more fans at each pan, or multiple fans arranged in multiple locations to maximize the evaporation rate. The fan itself is provided at one end or at both ends of the system.

In an alternative embodiment of the present invention, an improved molded pan is provided. It has a plurality of guides along its length to aid the spread of effluent on the pan, a plurality of spreaders to spread the effluent for better evaporation, a plurality of provisions to attach a plurality of removable support blocks. The spreaders are available in multiple configurations having various shapes and angles. The pan is made up of material including but not limited to engineering plastic and has a tapered leading edge to reduce obstruction to air flow. The pan assembly is supported by the removable support block with an injection line showing the direction of spray.

BRIEF DESCRIPTION OF THE DRAWING

The present invention will be described with reference to the following figures. The figures and the associated descriptions are provided to illustrate embodiments of the invention and not to limit the scope of the invention.

DETAILED DESCRIPTION OF THE INVENTION

Figure 1:
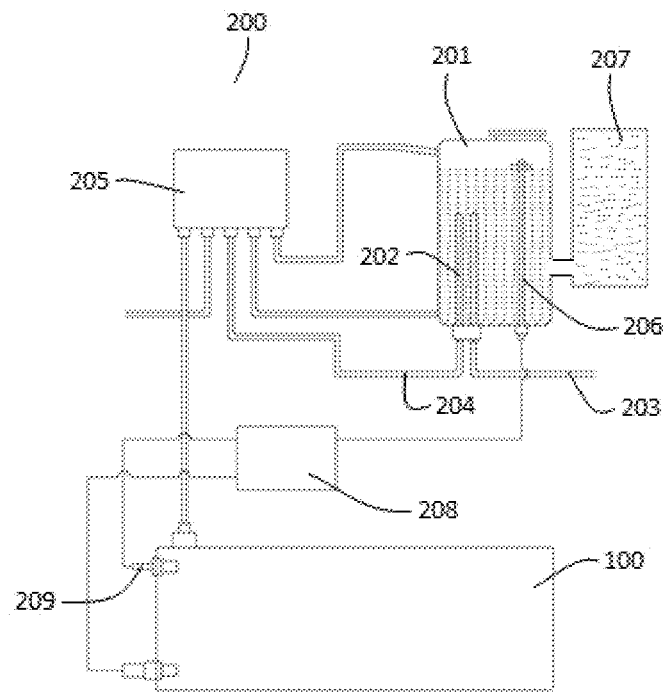
FIG. 1 is a process layout of an evaporator system for maximizing effluent liquid evaporation in accordance with an embodiment of the present invention.

The present invention now will be described more fully hereinafter with reference to the accompanying drawing, in which some, but not all embodiments of the inventions are shown. While the following description details the preferred embodiments of the present invention is not limited in its application to the details of construction and arrangement of the parts illustrated in the accompanying drawing.

With reference to the figures, numerical designation has been given for each element to facilitate the reader's understanding of the present invention, and particularly with reference to the embodiments of the present invention illustrated in the figures; various preferred embodiments of the present invention are set forth below. The enclosed description and drawing are merely illustrative of preferred embodiments and represent several different ways of configuring the present invention. Although specific components, materials, configurations and uses of the present invention are illustrated and set forth in this disclosure, it should be understood that a number of variations to the components and to the configuration of those components described herein and in the accompanying figures can be made without changing the scope and function of the invention set forth herein.

The present invention provides an automated, self contained system for treatment of waste liquid like but not limited to an RO reject, and other effluent liquids, by utilizing industrial waste-energy or renewable energy, like solar and wind energy, to maximize the evaporation rate as compared to natural evaporation rate, and further provides an integrated electric control unit to adjust the whole functioning of system in real time depending upon conditions such as ambient temperature, ambient humidity, effluent temperature etc. The automated self contained system increases the evaporation rate by 25-30 times natural rate and minimize the capital cost and treatment/operational cost. The system is compact and closed utilizing evaporation principle.

In the main embodiment of the present invention, an apparatus for maximizing liquid evaporation is provided. The apparatus comprises a housing with a rear duct and a fan duct, at least one effluent holding tank with or without a heat exchanger, a plurality of pans stacked one above another, said stack of pans positioned between the rear duct and the fan duct, a multi point injection system with optimized injection nozzles for supplying with controlled amount of the effluent liquid to said plurality of pans from the effluent holding tank, at least one mist separator, a control panel and an effluent management system. The heat exchanger is provided in effluent tank to raise the temperature of effluent. The fan duct contains at least one fan to blow preferably a high CFM fan, and facilitate circulation of normal or temperature controlled air over the surface of pans. The pans are supplied with a controlled amount of the effluent liquid from the effluent holding tank so as to facilitate accelerated evaporation. In addition, the pans have a top cover with plurality of means to divert the air on to the surface of the effluent liquid to expedite the forced vaporization and the overall process of treatment. The mist separator is installed before the fan duct to prevent any small water particles from escaping to atmosphere. The plurality of pans are rolled off for maintenance purpose and the plurality of pans are increased or decreased to enlarge or contract the overall apparatus.

The control panel further has a plurality of sensors connected to it to monitor a plurality of variables, a programmable processor. The control panel ensures a high rate of evaporation by feeding a calculated quantity of liquid inside pan, the calculation is based on variables like but not limited to effluent temperature, ambient air temperature and ambient humidity. The injection system consists of an injection line, overflow line, an optional flush line and an optional level balance line and an optional secondary effluent heater to raise temperature of ambient air.

In another embodiment of the present invention, various arrangements of the plurality of pans are possible including but not limited to:

a single stack arrangement with a plurality of pans and each pan lying on the other with an optimized gap in between;

a plurality of stacks with each stack having a plurality of pans and each pan separated from the other pan with an optimized gap in between. The stacks are possibly arranged adjacent to each other, sharing the injection system and fan duct(s); or a plurality of stacks with each stack having a plurality of pans and each pan separated from the other with an optimized gap in between. The stacks are arranged adjacent to each other such that the rows of pan in one stack are at staggered position with respect to the rows of pans in adjacent stack. More particularly, a pan is positioned at a level between two pans of stack adjacent to it. By this way, dry air from one pan reaches surface of pan in an adjacent stack thus maximizing the evaporation rate.

In another embodiment of the present invention, various arrangements of the fan duct are possible like but not limited to a large fan duct having a single or multiple fans arranged in a panel, or an individual fan duct with one or more fans at each pan, or multiple fan ducts with fans arranged in multiple locations to maximize the evaporation rate.

In an optional embodiment of the present invention, the ambient air is preheated using an optional secondary heater to raise temperature of ambient air before entering into the pan. The heat is exchanged with the air coming in to the pan. This preheating of air further expedites the evaporation rate.

In an embodiment of the present invention, a closed system able to adjust the whole functioning of system in real time depending upon conditions such as ambient temperature, effluent temperature and ambient humidity. The control panel and the effluent management system function in tandem with a plurality of sensors to calculate the amount of effluent to be injected at each injection event based on real time processing of data.

In an embodiment of the present invention, a system is provided which is able to maintain high wind speed uniformly over the treatment zone with level control system and with minimum electrical energy consumption. The system uses only 1.1 watts per liters of liquid evaporated.

In an embodiment of the present invention, the effluent holding tank is made up of material such as, but not limited to stainless steel, epoxy coated mild steel, plastic etc. to provide chemical and corrosion resistance. In an optional enhancement, a heat exchanger is submerged inside the effluent holding tank to raise the temperature of inside effluent. Said heat exchanger is connected to a heat source such as a solar dish, a boiler or any other heat source and has at least one inlet and outlet port. Hot liquid enters in the inlet port of the heat exchanger and raises the temperature of the effluent in the effluent holding tank and cold liquid comes out of outlet port which goes back to the heat source to be heated again. This circuit is continuous and the flow rate in heat exchanger is so maintained to maintain the effluent surface temp above 75 degree Celsius. The material of the heat exchanger is so chosen to prevent it from corrosion and to have high heat transfer rate such as copper, aluminium, etc. Further, the heat exchanger is provided with monitoring accessories such as, but not limited to a temperature sensor to monitor and record the temperature of effluent inside. Alternately, any other state of the art device is used to raise the temperature of the effluent liquid.

In an embodiment of the present invention, a plurality of pans is provided to facilitate the evaporation process of effluent and the pans are stacked with an optimized separation between them to assure optimum evaporation rates. The pans are very thin plates for holding effluent liquid to a fixed level. The pan is made up of material such as, but not limited to stainless steel, plastics etc. having corrosion resistant and hydrophilic properties. In an exemplary embodiment, the pans are separated and the gap between them is optimized to achieve higher wind speeds (15-25 m/s) over liquid speed. The pans are provided with guiding channels on its top surface to assure even spread of the effluent on pans for better evaporation. Further, the pans are also having features that direct the flow of unevaporated water to the sides i.e. curvature on its top surface to facilitate draining of excess liquid to the sides and into a flush tank. The pan surface also has spreaders which increase the spread of the effluent on the surface, these spreaders are available in multiple configurations having various shapes and angles. The pan surface is enhanced with microscopic channels which facilitate the spreading of the liquid on the pan surface due to capillary action. These channels are either parallel to the direction of flow or perpendicular to the direction of flow or other directions in order to enhance the wetting of the surfaces leading to an enhancement in the rate of evaporation. The pans are rested on a stand made up of material such as, but not limited to stainless steel, epoxy coated mild steel, plastic etc. to provide chemical and corrosion resistance. Alternately, the pans are also guided into slots made on pillars.

In an alternative embodiment of the present invention, an improved molded pan is provided. It has a plurality of guides along its length to aid the air flow, a plurality of spreaders to spread the effluent for better evaporation, and a plurality of provisions to attach a plurality of removable support blocks. The pan is made up of material including but not limited to engineering plastic and has a tapered leading edge to reduce obstruction to air flow. The pan assembly is supported by the removable support block with an injection line showing the direction of spray.

Further, the pans are either vibrated at ultrasonic or other frequencies to allow conversion of surface film into a vapor thereby assuring better evaporation. A suitable cleaning method for removing the deposits on the pans is created which are optionally automated or manual, which allows the solids to be packed in bags for disposal.

Further, the stand or the pan guides are designed to bear the weight of pans and liquid inside pans and also maintain a tilt angle to get the uniform spread of liquid on injection over the full pan area. The stand is easily dismantled into small units and thus transported very easily. In another optional embodiment, the top covers are made of a transparent material such as, but not limited to toughened glass, acrylic sheet, etc, for intake of maximum solar irradiance to expedite the evaporation rate.

The air is circulated either by having the front cover connected with plurality of high CFM fans at one side while the other side is kept open for suction of air, with rest of the sides being air sealed. Alternatively, a single fan having a high speed motor and fan blades is connected to the side of the pans towards the fan duct while the other side is kept open for suction of air from rear duct. Provided plurality of fans or a single fan is used to maintain high wind speed in range of 5-15 m/s over the effluent liquid surface on the pans. The plurality of fans or a single fan is so placed along the pan width to maintain a uniform wind speed over full pan area. Further, speed of fan is adjustable and controlled with an automated system. The start and stop cycle of the fans is controlled by dosing controller and the timings are resettable in (supervisory control and data acquisition) SCADA system.

In an embodiment of the present invention, an effluent management system contains a level switch to maintain liquid level of effluent holding tank. The level switch is provided in line with the power connection of an effluent feed pump which connects a raw effluent holding tank to an effluent holding tank. As the level switch detects a decrease in the effluent level in the effluent holding tank, it sends a signal to turn ON the pump and fill the effluent from raw effluent tank to effluent holding tank to maintain the level. Further, level switch also sends signal again to turn OFF the pump and effluent flow stops. The level is maintained accurately. The level switch is selected to sustain high temperature and to prevent corrosion.

In an embodiment of the present invention, the control panel makes sure the high rate of evaporation by feeding a calculated quantity of effluent inside pans, such calculation is achieved by processing data pertaining to ambient variables in real time and processing the same through an AI system. The variables considered by the control panel are, but not limited to, ambient temperature, ambient relative humidity and tank temperature. The control panel is made of durable material and has encapsulated electronics including a communication gateway and a programmable processor. An algorithm program depicts the quantity of effluent to be injected based on expected effluent temperature and evaporation rate using variables. The control panel is further configured to control the functioning of injection system, injection pump, a flush pump and fan/fans.

In an embodiment of the present invention, a multi-point injection system consists of an injection line, an overflow line, a flush line and a level balance line. The injection line consists of pipes, flexible hoses, injection nozzles and fittings on pan to spray the hot effluent from the effluent holding tank to the pans. The location and design of the injection nozzles is such that to ensure high contact are between hot effluent and incoming wind. The number of injection nozzles are optimized to obtain uniform distribution of effluent. The injection system is arranged so as to make sure that only hot effluent goes into pan and cold unevaporated effluent returns back to the effluent holding tank. The overflow line is to prevent effluent from spilling over from pan in case of any malfunctioning. It also defines the maximum height of the effluent that goes inside pan at a given instant. Effluent above the overflow port on the pan gets automatically transferred to the raw effluent tank. Flush line makes sure to have minimum effluent inside the pan during evaporation cycle. The flush ports provided on the pans helps to transfer effluent from pan to flush tank and then back to effluent tank. Flush from pans is guided into a common drain system and collected in the Flush tank below.

In an optional embodiment, the injection nozzles are ultrasonic nozzles that create a fine mist of the liquid being sprayed on to pans to assure high evaporation rates. The multi point injection system includes a set of nozzles arranged on a manifold to optimally spray the liquid on the pans. The system allows the nozzle distance and nozzle angle to be adjusted as per requirement. The nozzles are so arranged that both top and bottom surface of the pans is sprayed.

As shown in FIG. 1, a lay-out of evaporation system 200 comprising an apparatus 100 for maximizing effluent liquid evaporation in accordance with the present invention is given. The system 200 shows an effluent holding tank 201 having a submerged heat exchanger 202 to raise the temperature of effluent. Heat exchanger 202 receives hot effluent heated from a heat source enters through an inlet port 203 of the heat exchanger 202 and raise the temperature of the effluent and cold effluent comes out of outlet port 204 which goes back into heat source to heat again. This circuit is continuous and the flow rate in heat exchanger 202 is so maintained to maintain the effluent surface temp above 70 degree Celsius. Further, an effluent management system 205 is provided to automate and maintain the effluent level in apparatus 100 keeping constant level of effluent and periodic fill at the same time. Further, effluent management system 205 commands a level switch 206 to maintain effluent level of effluent holding tank 201. Level switch 206 detects the decrease in the level of effluent holding tank 201 and sends a signal to turn ON the pump and fill the effluent from raw effluent tank 207 to effluent holding tank 201 to maintain the level. Further, level sensor 206 also sends signal again to turn OFF the pump. A control panel 208 is provided to makes sure the high rate of evaporation by feeding the calculated quantity of effluent inside apparatus 100. Control panel 208 further comprises a plurality of sensors to monitor a plurality of variables. The sensors include but not limited to temperature sensor, humidity sensor, wind speed sensor, etc. The control panel 208 has a programmable processor with an algorithm to deduce the quantity of effluent to be injected based on measured effluent temperature, ambient temperature and ambient humidity, and evaporation rate is calculated by software based on an intelligent algorithm. The control panel 208 is configured to control the injection pump, flush pump and fans of apparatus 100. Further, effluent management system 205 controls the temperature of ambient air by optionally preheating it using an optional secondary effluent heater 209 before entering into the apparatus 100. The heat is exchanged with the air coming in to the apparatus 100 to expedite the evaporation rate.

The level switch is possibly a state of the art level switch that uses ultrasonic, laser or pressure variation methods to continuously monitor the depth/level of fluid in a tank. Though, the ultrasonic methods are expensive and the pressure variation methods are inaccurate.

Figure 2:
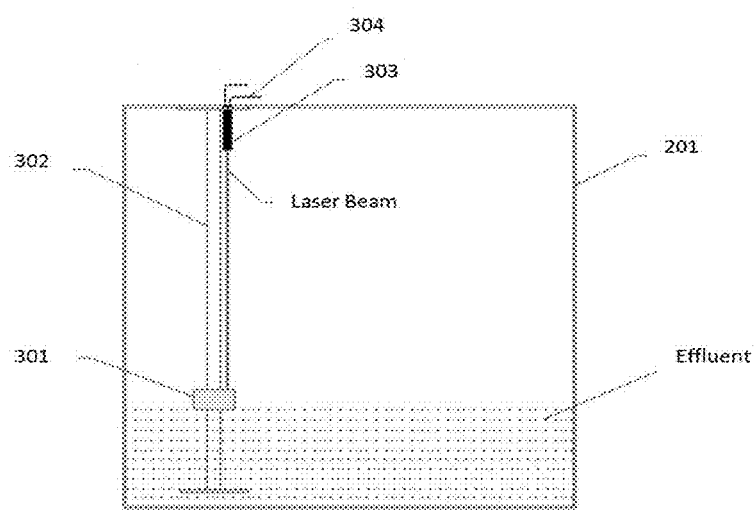
FIG. 2 is a diagram showing a level switch to sense the level of effluent in an effluent holding tank.

The level switch 206 with laser sensor, as shown in FIG. 2, is alternately deployed with a simple float 301 on a rod 302 hung inside the tank 201. The change of level of the liquid causes an up or down motion of the float. A laser distance measuring device 303 focused on the float senses the change in distance which is then converted to change of level in the background and communicated to the control panel through signal 304.

Figure 3:
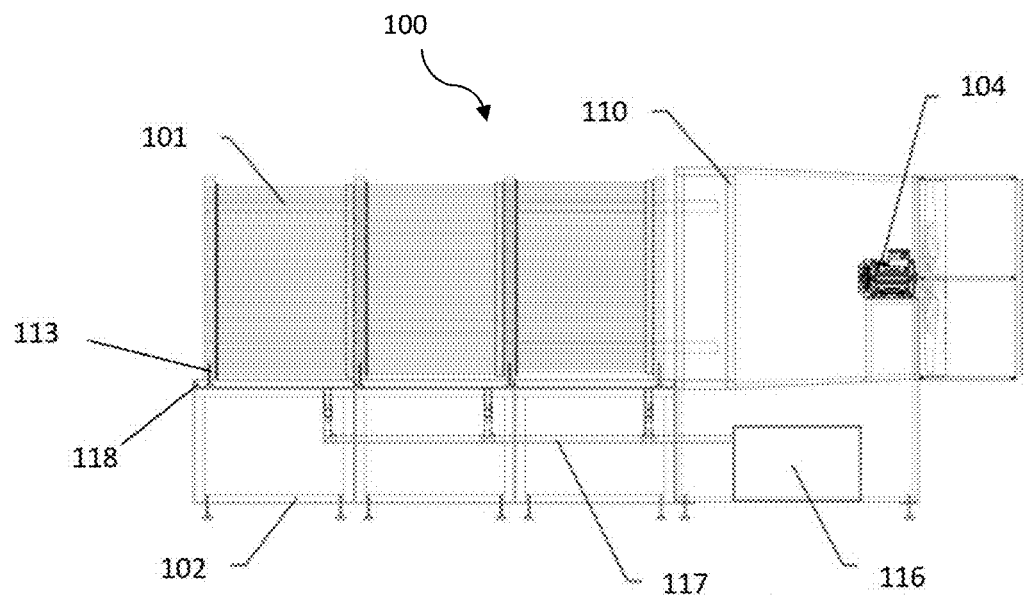
FIG. 3 is a layout view of an apparatus view of an apparatus with a single fan arrangement, and side panels removed, for maximizing effluent liquid evaporation.

As shown in FIG. 3, a layout view of an apparatus 100 with a frame 102, a fan duct 110 for maximizing effluent liquid evaporation in accordance with an embodiment of the present invention is given. The fan duct 110 is connected on one side of apparatus 100. The apparatus comprises a plurality of pans 101 stacked and kept adjacent on a base 118. The height is adjusted by adjustable level pads 113. The apparatus further comprises a flush tank 116 connected to the base through connecting pipe 117 and collects unevaporated effluent.

Figure 4A:
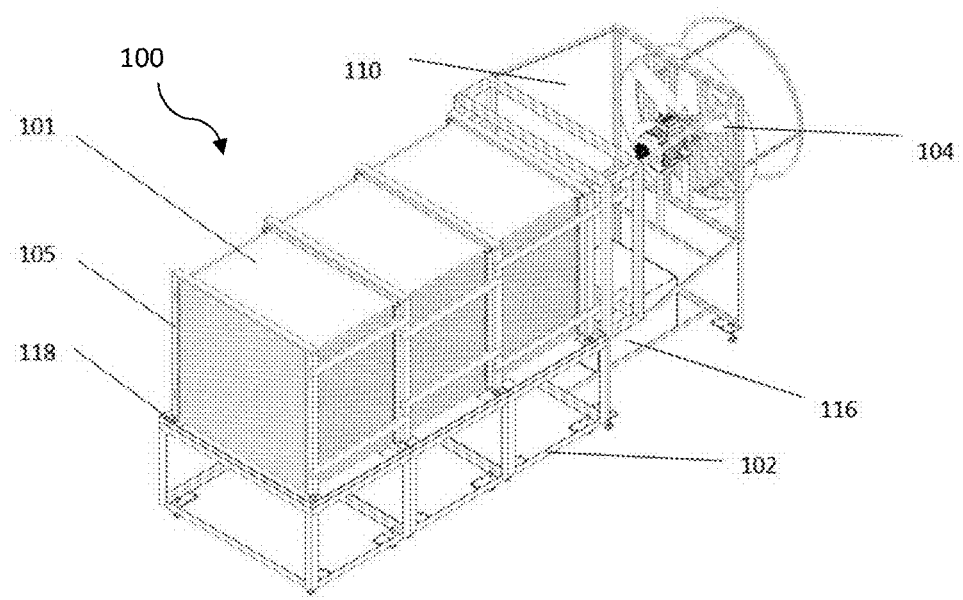
FIG. 4a is a perspective view of an apparatus with a single fan arrangement, and side panels removed.
Figure 4B:
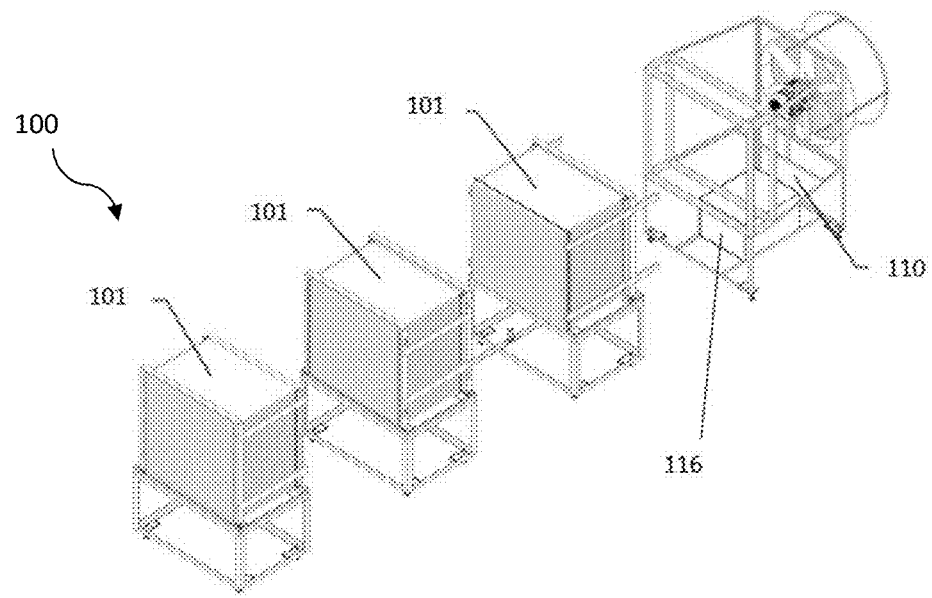
FIG. 4b is an exploded perspective view of the apparatus with a single fan arrangement with individual pan modules shown.

As shown in FIG. 4a, a perspective view of an apparatus 100 with side panels removed for clarity which has a stand 102, a fan duct 110 for maximizing effluent liquid evaporation in accordance with an embodiment of the present invention is given. The fan duct 110 is connected on one side of apparatus 100. The apparatus comprises a plurality of pans 101 stacked and kept adjacent on a base 118 in a modular manner. FIG. 4b depicts the exploded view of modular arrangement of pans.

Figure 4C:
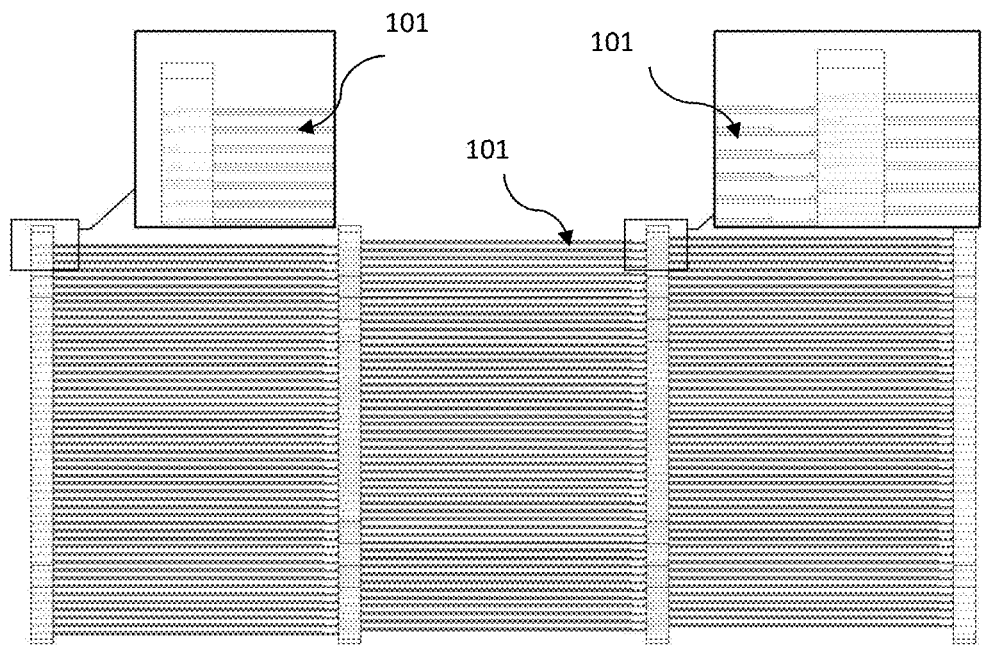
FIG. 4c is a side view of the pans in staggered arrangement.

As shown in FIG. 4c, the staggered arrangement of the plurality of pans 101 is given. The stacks are arranged adjacent to each other such that the rows of pan 101 in one stack are at staggered position with respect to the rows of pans in adjacent stack. More particularly, a pan is positioned at a level between two pans of stack adjacent to it. The plurality of pans 101 in one stack are at a stepped up position with respect to the pans of other stack adjacent to it.

Figure 5:
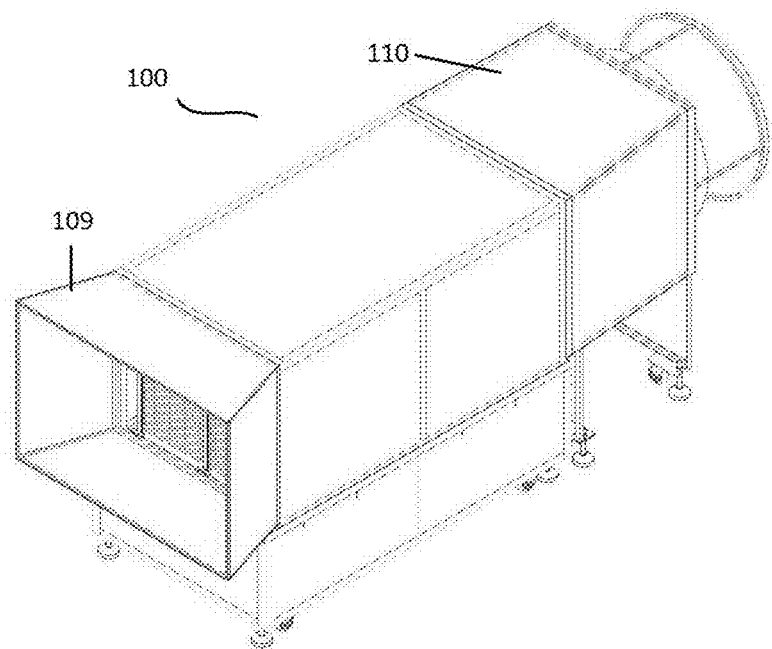
FIG. 5 is a perspective view of the apparatus in accordance with an embodiment of the present invention.

As shown in FIG. 5, a perspective view of an apparatus 100 with a fan duct 110 for maximizing effluent liquid evaporation in accordance with an embodiment of the present invention is given. The fan duct 110 is connected on one side of apparatus 100 and a rear duct 109 is connected on the opposite side of the apparatus 100 for a channelized flow of hot air for maximizing evaporation. The fan duct 110 comprises of at least one high speed fan preferably a high CFM fan.

Figure 6:
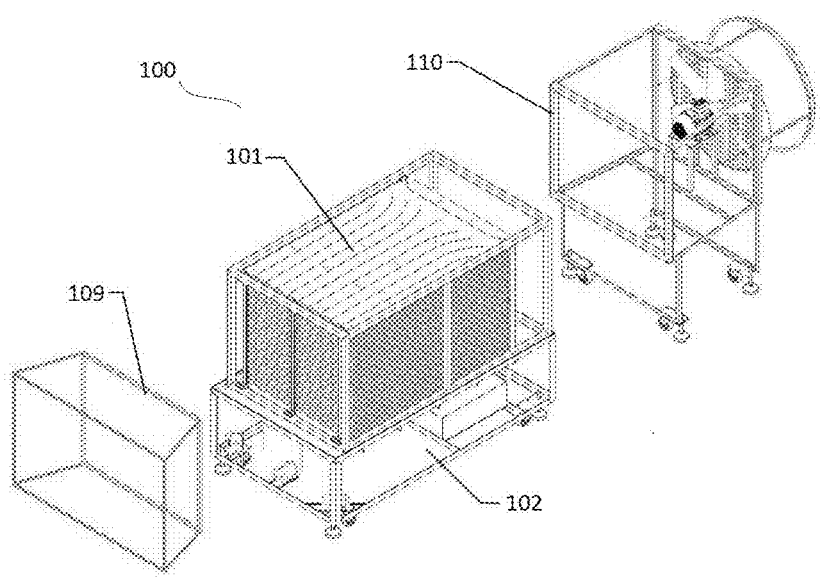
FIG. 6 is an exploded perspective view of an apparatus, with side panels removed in accordance with an embodiment of the present invention.

As shown in FIG. 6, an exploded perspective view of an apparatus 100 with a single fan arrangement 110 is given. The single fan arrangement 110 is connected on one side of the pans 101 rested on stand 102 and a rear duct 109 is connected on the opposite side of the pans 101 for a more channelized flow of hot air for maximizing evaporation. The single fan arrangement 110 comprises of a high speed fan, a fan blade and a fan duct.

Figure 7A:
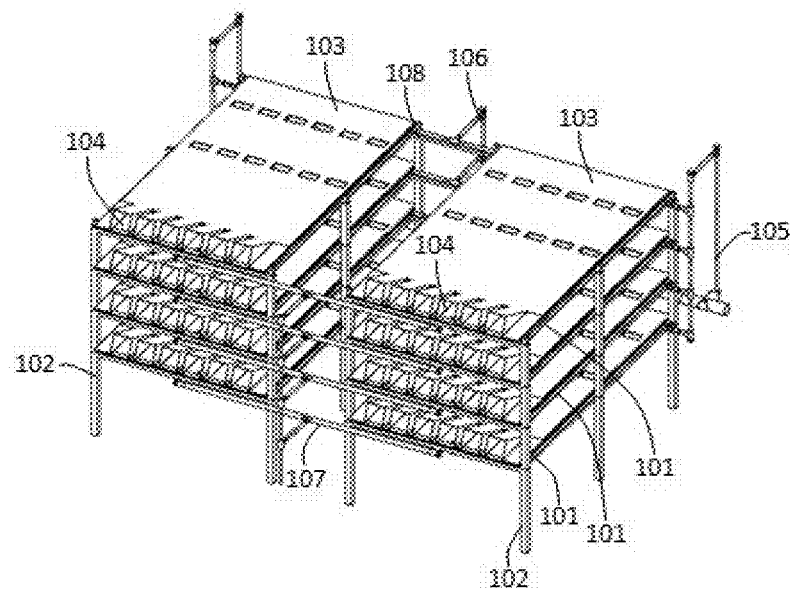
FIGS. 7a, 7b and 7c show an alternate arrangement of pans for maximizing effluent liquid evaporation in accordance with an alternate embodiment of the present invention.

As shown in FIG. 7a, a perspective view of an alternate arrangement of the plurality of the pans 101 and injection system for maximizing effluent liquid evaporation according to an alternate embodiment of the present invention is given. The plurality of pans 101 made up of material such as, but not limited to stainless steel, plastic etc. for corrosion resistant properties. The gap between the pans 101 is optimized to achieve higher wind speeds (5 to 15 m/s) over the pan surface. The pans 101 are rested on the stands 102 made up of material such as, but not limited to stainless steel, epoxy coated mild steel, etc. to provide chemical and corrosion resistance. Further, stands 102 are designed to bear the weight of pans 101 and effluent inside pans 101 and also maintains a tilt angle to get the uniform spread of effluent on injection over the full pan 101 area. The suction of the pans 101 is so designed to ensure high wind speed at pan 101 inlet. Further, the pans 101 are covered from top 103 transparent cover with a plurality of fan ducts with fans 104 attached to them. Transparent top cover 103 is made up of material such as, but not limited to toughened glass, acrylic sheet, etc., for intake of global irradiance to expedite the evaporation rate. One side of the top cover 103 is connected with fans 104 and other side is kept open for suction of air while rest of the sides are air sealed. The fans 104 are used to maintain high wind speed in range of 5 to 15 m/s over the effluent liquid surface. Fans 104 are so placed along the pan 101 width to maintain a uniform wind speed over full pan 101 area. Further, the apparatus 100 comprises of an injection system consist of an injection line 105 to guide the hot effluent to pan 101, an overflow line 106 to prevent effluent from spilling over from pan in case of any malfunctioning, a flush line 107 to make sure to have minimum thermal mass inside the pan during evaporation cycle and a level balance line 108 to maintain the same effluent level between the pans at the same height.

Figure 7B:
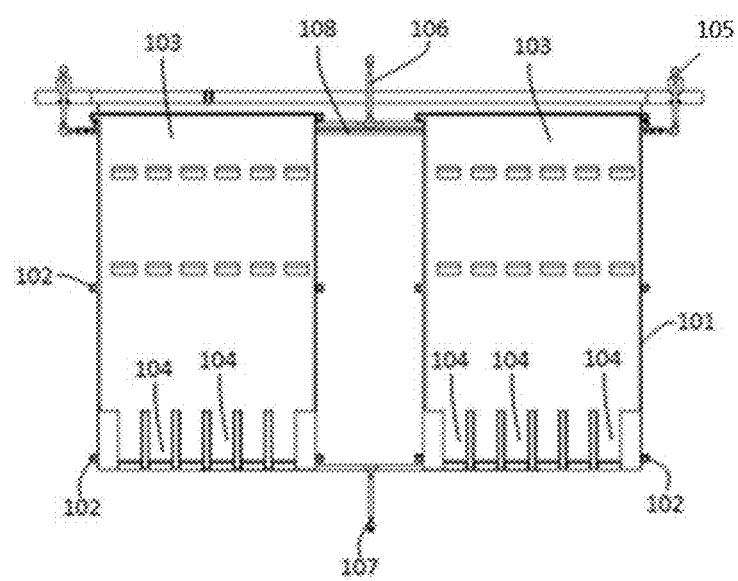

As shown in FIG. 7b, a top view of the arrangement of plurality of pans 101 as shown in FIG. 7a, for maximizing effluent liquid evaporation according to an alternate embodiment of the present invention is given.

Figure 7C:
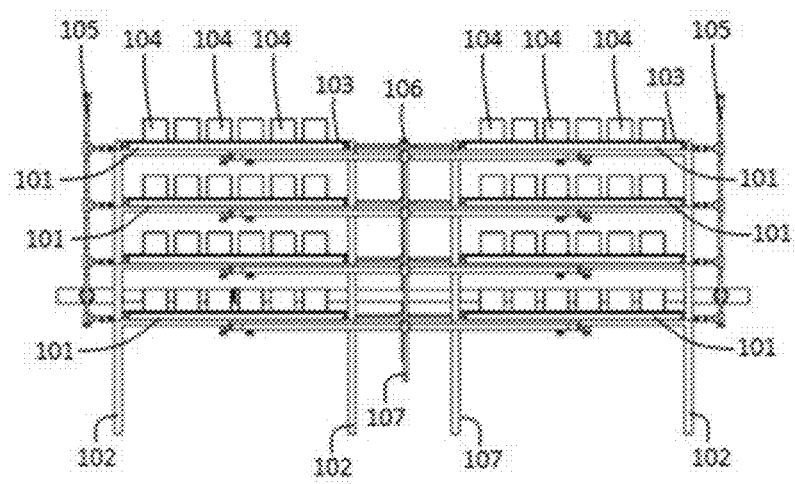

As shown in FIG. 7c, a front view of an alternate arrangement of FIG. 7a is given. The injection system consist of an injection line 105 to guide the hot effluent to pan 101, an overflow line 106 to prevent effluent from spilling over from pan in case of any malfunctioning, a flush line 107 allows drawing of unevaporated liquid to drain in to the flush tank, during evaporation cycle and a level balance line 108 to maintain the same effluent level between the pans at the same height.

Figure 8:
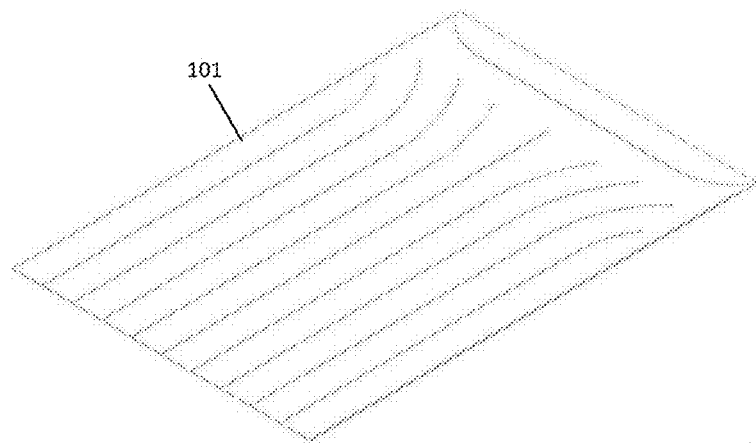
FIG. 8 is a perspective view of a pan with features for directing flow of effluent on the pan.

As shown in FIG. 8, a perspective view of the pans 101 arranged in the apparatus 100 for maximizing effluent liquid evaporation is given. The pans 101 are provided with guiding channels on its top surface to assure even spread of the effluent on pans for better evaporation. Further, the pans are also having features that direct the flow of unevaporated water to the sides i.e. curvature on its top surface to facilitate draining of excess liquid to the sides and into the flush tank. The pans 101 are further connected to a vibrating device to vibrate at pans at ultrasonic frequencies to allow conversion of surface film into a vapor thereby assuring better evaporation.

Figure 9A:
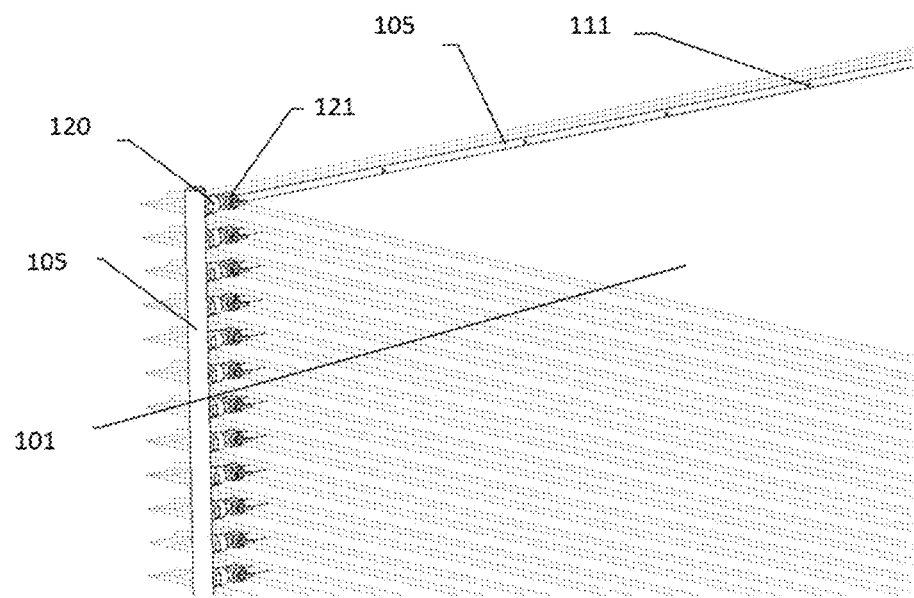
FIGS. 9a-9f show different views of the injection system in accordance with the present invention.
Figure 9B:
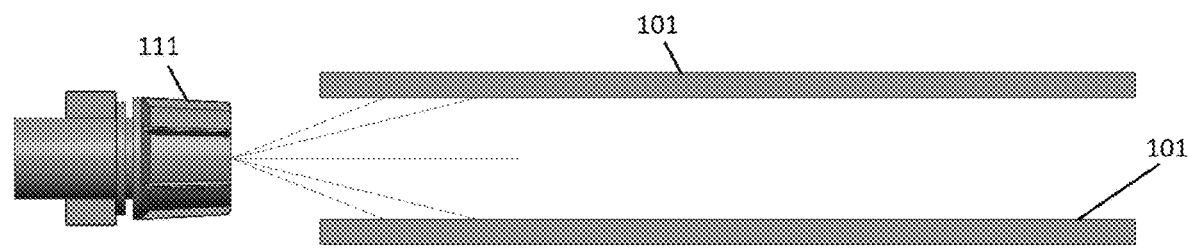

As shown in FIG. 9a, a partial view of the pans 101 in the apparatus of present invention for maximizing effluent liquid evaporation is given. The injection line 105 guides the hot effluent to pans 101 and comprises of vertical and horizontal channels, connecters 120 and valves 121, orifices or injection nozzles 111 to optimally spray the effluent on the top and bottom surface of the pan 101. The injection nozzles 111 are preferably ultrasonic nozzles that create a fine mist of the liquid being sprayed to assure high evaporation rates as indicated in FIG. 9b.

Figure 9C:
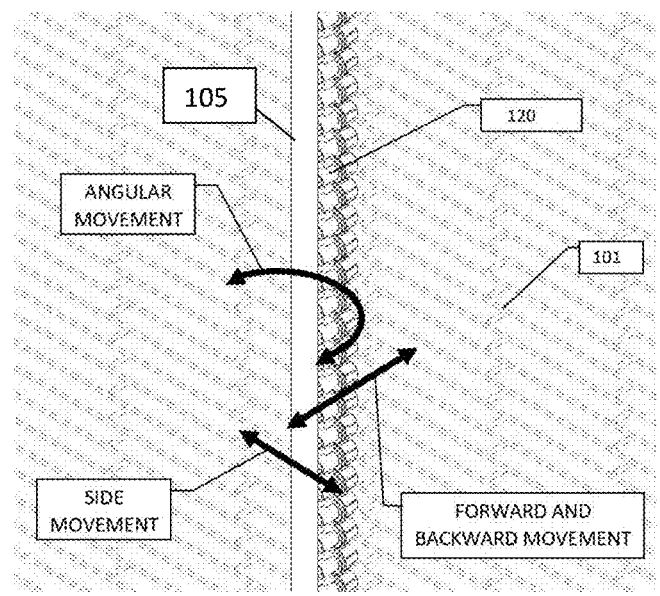

As shown in FIG. 9c, a perspective partial view of the pans 101 with injection line 105 in an apparatus 100 for maximizing effluent liquid evaporation is given. The injection line 105 is having at least one pipe arranged with a plurality of nozzles 120 to spray the plurality of pans 101 and the injection line 105 is movable in forward, backward direction and also angularly for uniform spray of the effluent in the pans. The injection line has adjustable brackets to move it in a desired direction either manually or by automated means known in the art. The nozzle distance and nozzle angle to be adjusted as per requirement.

Figure 9D:
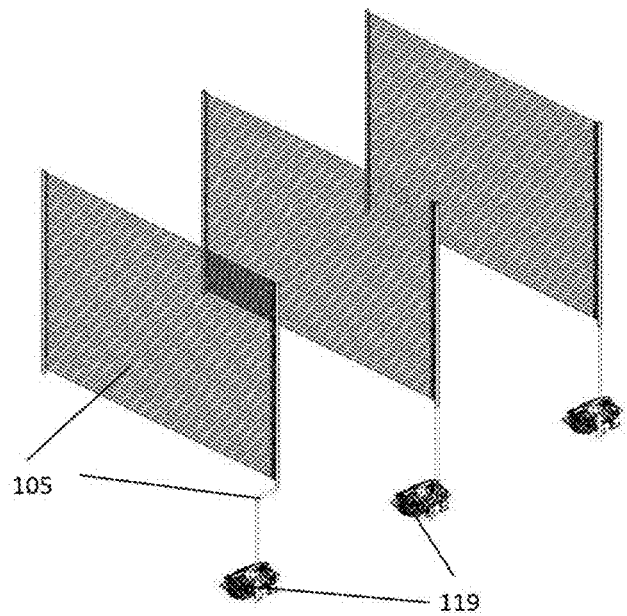

As shown in FIG. 9d, a view of an injection system for plurality of modular stacks of plurality of pans 101 is given, wherein the vertical and horizontal channels of injection line 105 is shown with injection pump 119. The horizontal channels of injection line 105 have a plurality of orifices to spray effluent on pans (not shown).

Figure 9E:
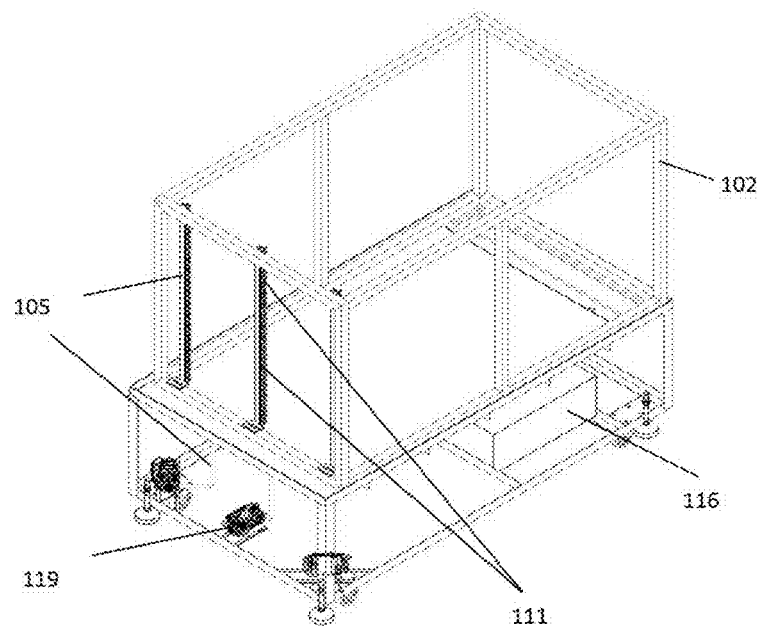
Figure 9F:
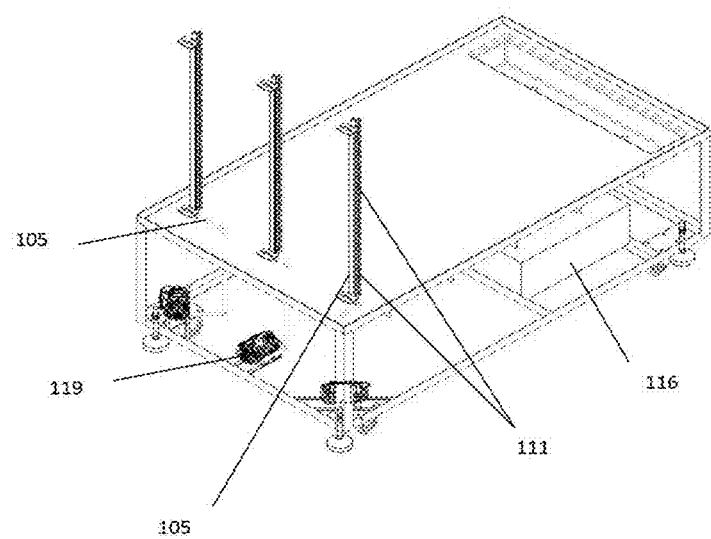

As shown in FIGS. 9e and 9f, an injection system with an injection line 105, injection pump 119 and a plurality of nozzles 111 on base of the apparatus according to one embodiment of the present invention is given. Flush tank 116 is shown.

Figures 10A, 10B:
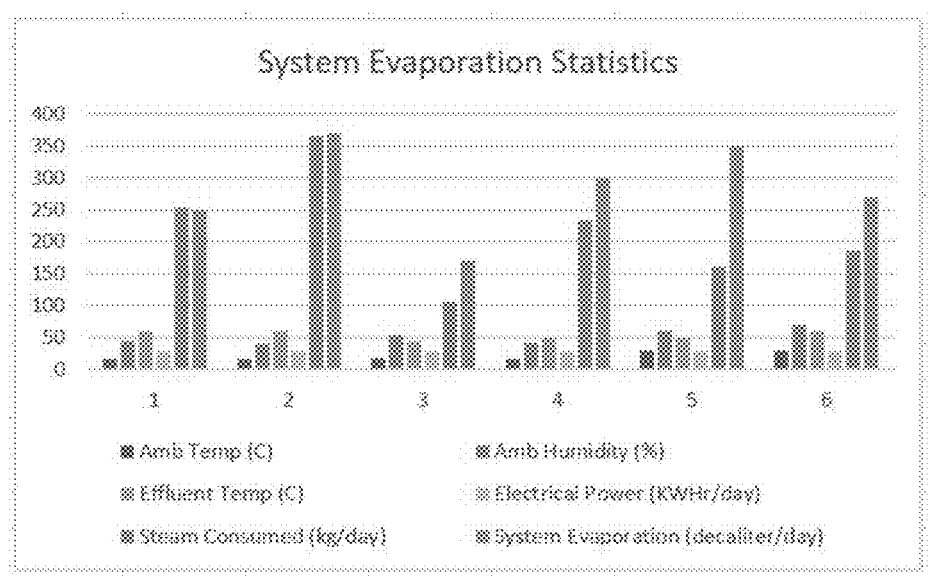
FIGS. 10a-10b show the efficiency of the evaporator run in batches over a period of days.

As depicted in FIGS. 10a-10c, the advantages of the present system is that the power consumption is much lower than any other system of evaporation. The apparatus and system consumes 10 KWH (10 Units) of power for 1 KL of evaporation per day. The efficiency of such systems is given by a factor called steam-ratio which is the quantity of effluent evaporated per Kg of steam consumed (heat equivalent). The system of present invention has shown an average steam ration of 14 while the conventional systems do not go beyond a steam ration of 2-3.

Figure 11:
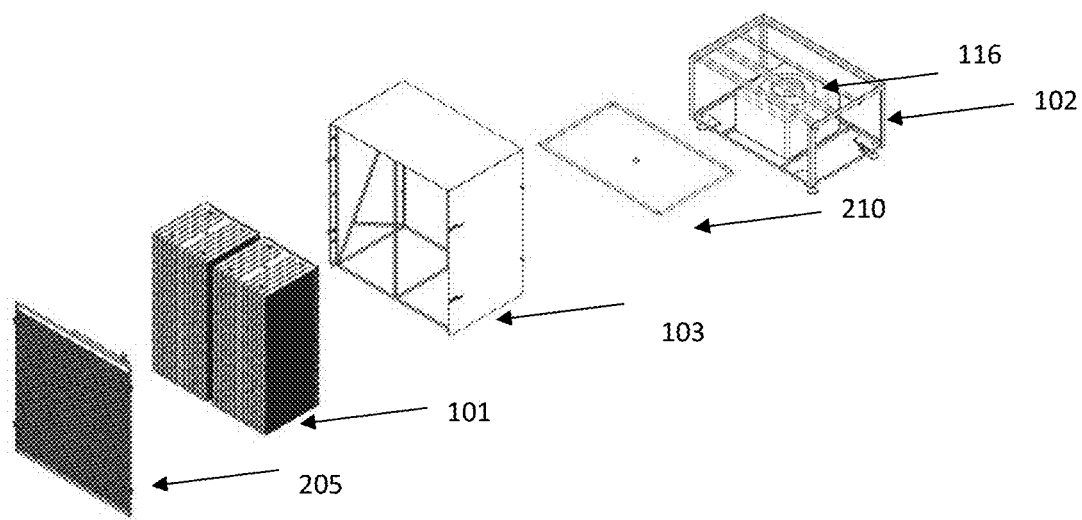
FIG. 11 shows an exploded view of the apparatus in accordance with an embodiment of the present invention.

As shown in FIG. 11, the exploded view of an apparatus 100 with a base frame 102, a plurality of pans 101 forming a pan assembly covered from transparent top cover 103 having a plurality of fan ducts with fans 104 attached to them is given. Transparent top cover 103 is made up of material such as, but not limited to toughened glass, acrylic sheet, etc., for intake of global irradiance to expedite the evaporation rate. One side of the top cover 103 is connected with fans 104 and other side is kept open for suction of air while rest of the sides is air sealed. The apparatus further comprises a flush tank 116 connected to the base frame 102 through connecting pipe 117 and collects unevaporated effluent, an injection system 205 for supplying with controlled amount of the effluent liquid to said plurality of pans from an effluent holding tank 201 and a drain pan 210 to collect the effluent and to facilitate the effluent to the flush tank 116.

Figure 12:
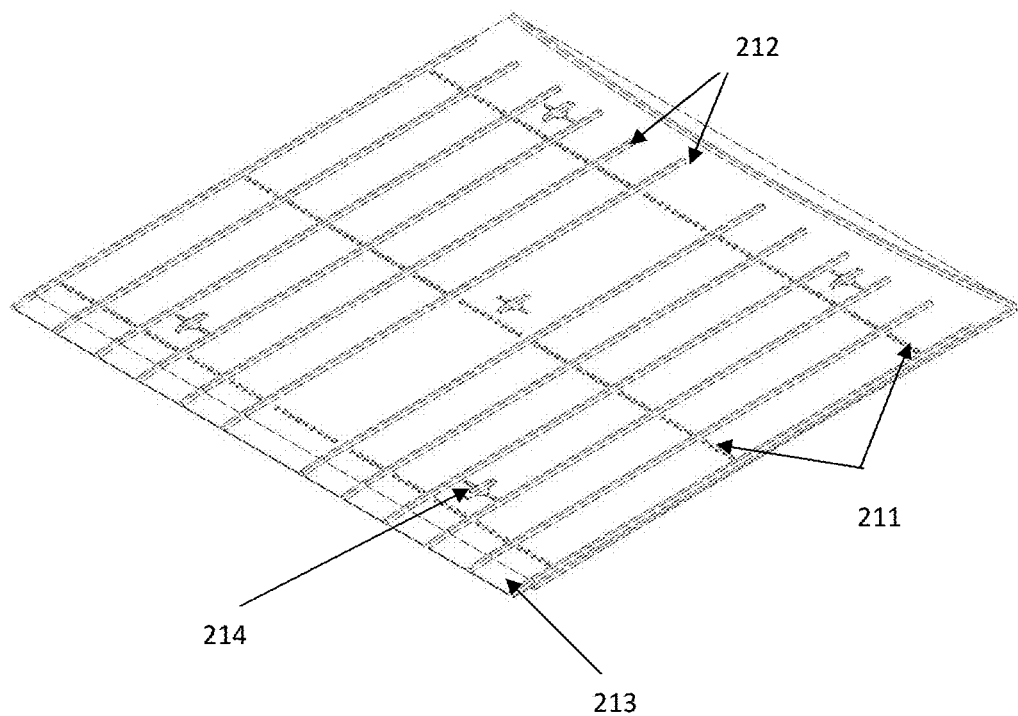
FIG. 12 shows a perspective view of an improved molded pan in accordance with an embodiment of the present invention.

As shown in FIG. 12, an improved molded pan in accordance to the embodiment of the present invention is given. The pan 101 is molded and rolled off for maintenance and made up of material but not limited to engineering plastic. The pan 101 has a plurality of guides 212 along its length to aid the air flow, a plurality of spreaders 211 to spread the effluent for better evaporation, plurality of provisions 214 to attach a plurality of removable support blocks 215 to reduce the need for maintenance. The pan has tapered leading edge 213 to reduce the obstruction to air flow.

Figure 13A:
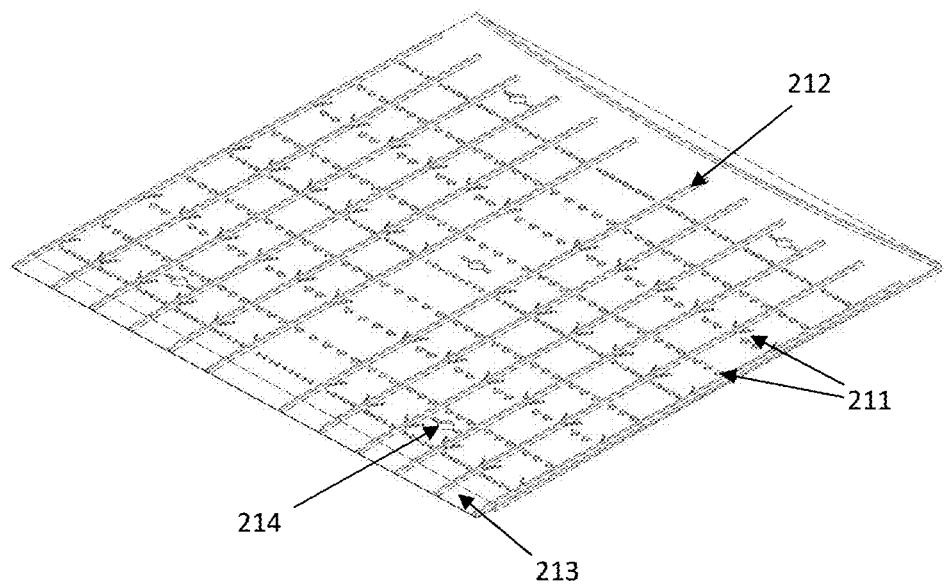
FIGS. 13a and 13b shows a configuration of spreaders and corresponding zoom image in a pan in accordance with the present invention.
Figure 13B:
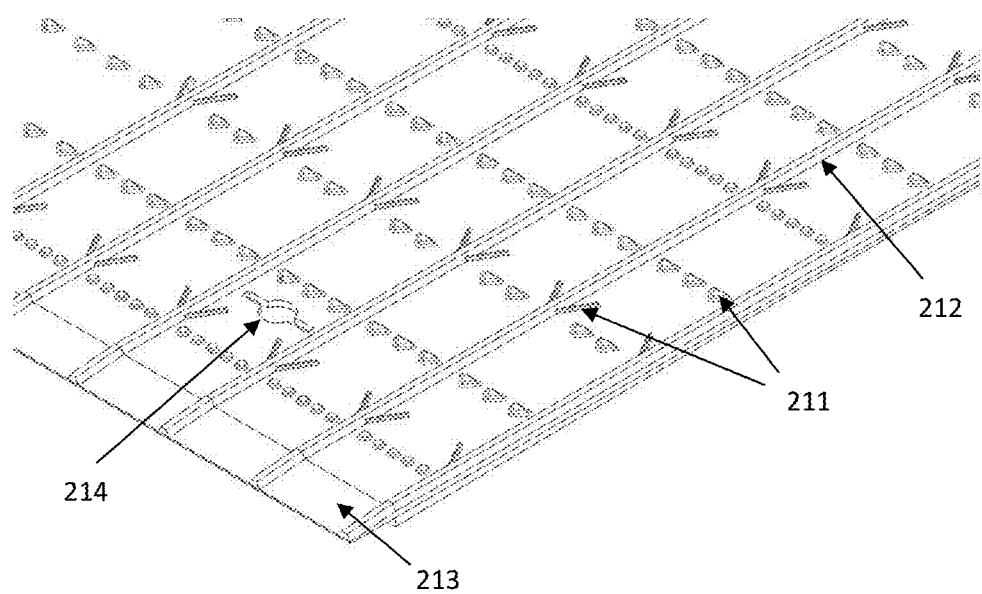
Figure 14A:
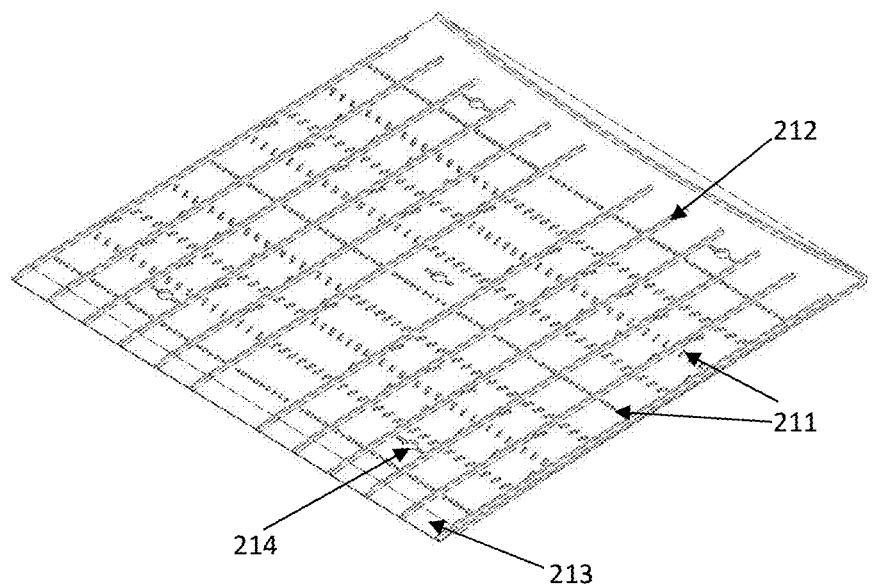
FIGS. 14a and 14b shows a configuration of spreaders and corresponding zoom image in a pan in accordance with the present invention.
Figure 14B:
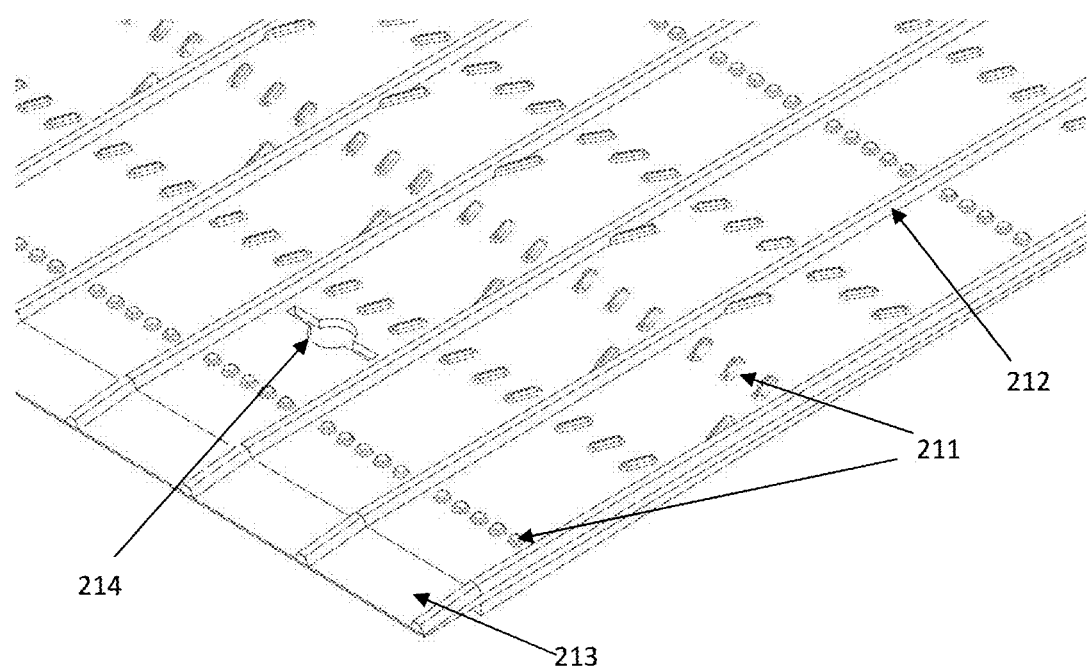
Figure 15A:
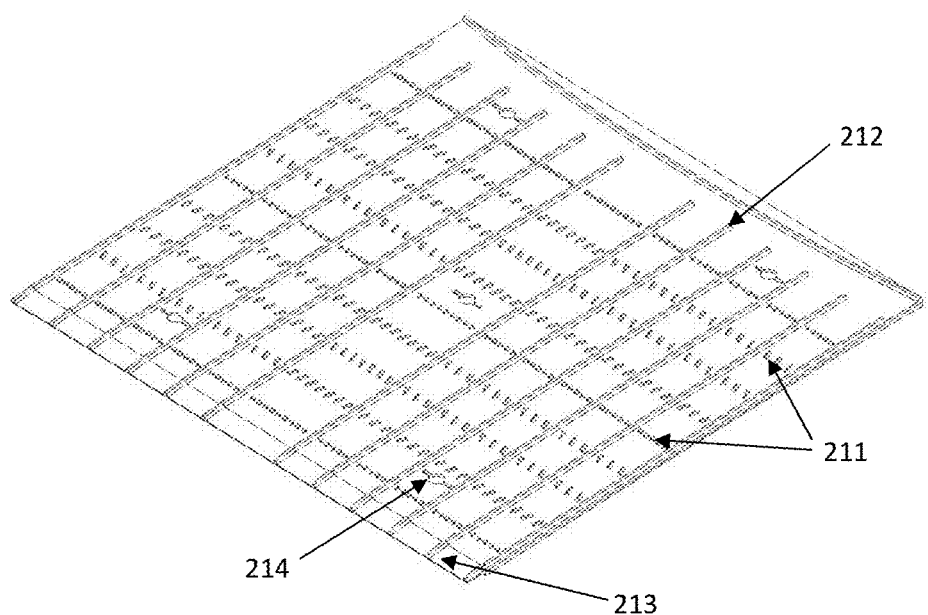
FIGS. 15a and 15b shows a configuration of spreaders and corresponding zoom image in a pan in accordance with the present invention.
Figure 15B:
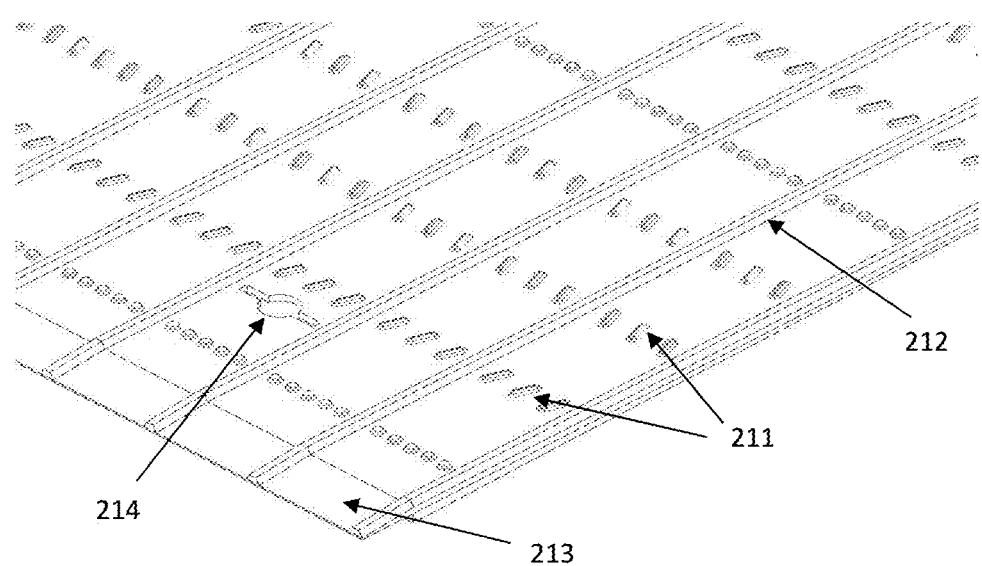
Figure 16A:
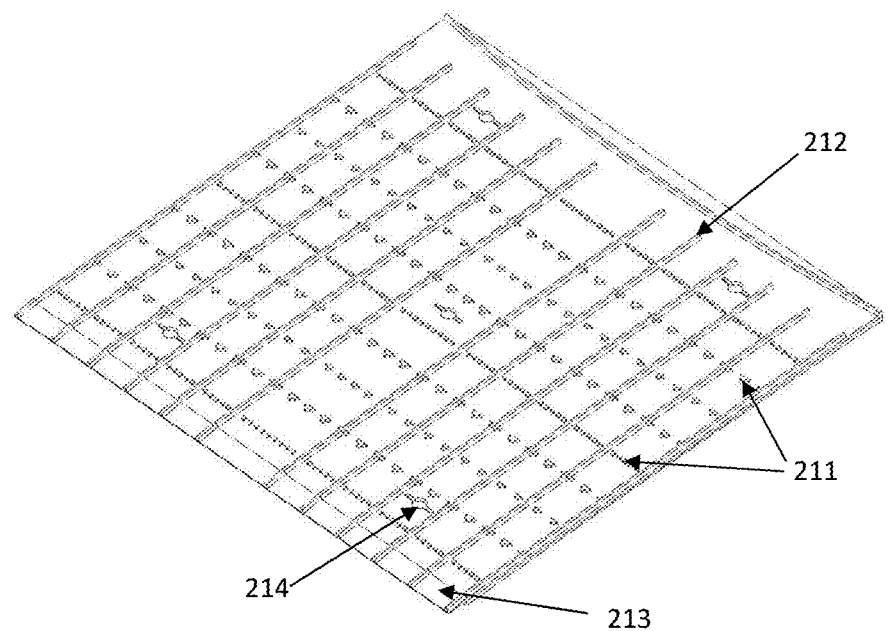
FIGS. 16a and 16b shows a configuration of spreaders and corresponding zoom image in a pan in accordance with the present invention.
Figure 16B:
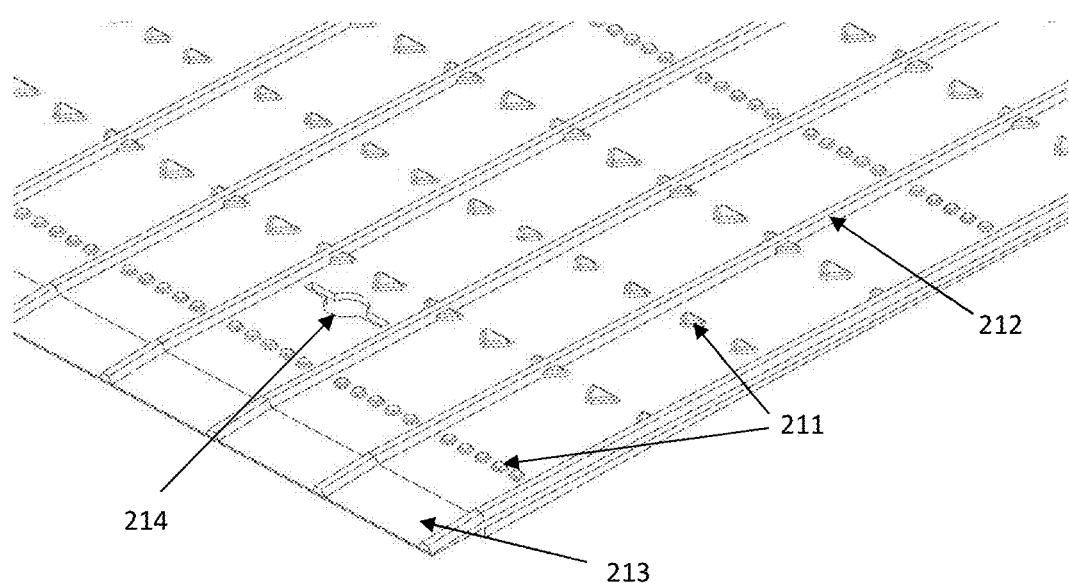

As shown in FIGS. 13a and 13b; 14a and 14b; 15a and 15b; and 16a and 16b, multiple configurations of spreaders 211 having various shapes and angles and their corresponding zoom image is given respectively. The spreaders 211 on the pan 101 increase the spread of the effluent on the surface of the pan 101. Each configuration has a plurality of guides 212 along its length to aid the air flow. Further, a plurality of provisions 214 to attach a plurality of removable support blocks 215 is provided. Also, there is a tapered leading edge 213 to reduce the obstruction of air flow.

Figure 17:
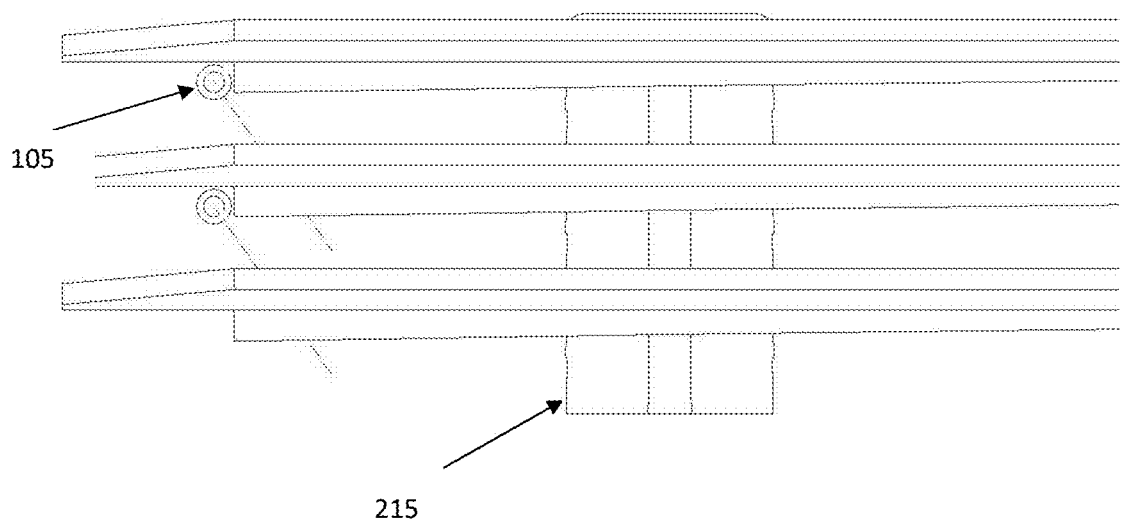
FIG. 17 shows a perspective view of a pan assembly in accordance with an embodiment of the present invention.

As given in FIG. 17, the pan assembly in accordance to the embodiment of the present invention is given. The pan assembly comprising of plurality of pans 101 is supported by the removable support block 215 with an injection line 105 showing the direction of spray.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

We claim:

1. A high efficiency system (200) for evaporation of an effluent liquid, said system having a flush ratio of 1 at an effluent temperature of 70 deg Celsius and a steam ratio of upto 14 at consumption of 10 KWHr/KL of effluent when measured at 25 deg Celsius temperature and a relative humidity of 60; said system comprising an apparatus (100), an effluent holding tank (201) with or without a heat exchanger (202), a control panel (208) and an effluent management system (205), wherein said apparatus (100) comprising:

a) a housing with a rear duct and at least one fan duct (110) at an end opposite to the rear duct, b) a plurality of pans (101) positioned between the rear duct and the at least one fan duct; and c) an injection system for supplying the effluent liquid to said plurality of pans (101) from an effluent holding tank (201) in a controlled amount, wherein, the at least one fan duct comprises at least one fan (104);

the plurality of pans (101) having a top surface and a bottom surface, said top surface having guides and/or curvature to maintain uniform layer of effluent liquid on said top surface;

the injection system comprises an injection line (105) to guide the effluent liquid to the plurality of pans (101), an overflow line (106) to prevent effluent from spilling over from the plurality of pans (101), and a flush line (107) to drain unevaporated effluent from the plurality of pans (101), said injection line comprising a plurality of orifices or nozzles (111) to spray the effluent liquid;

the effluent management system (205) controls the level of effluent liquid in the effluent holding tank and movement of effluent liquid through said injection system;

the control panel comprises a plurality of sensors to monitor a plurality of variables, a programmable processor, and a gateway for communication between said plurality of sensors and the effluent management system (205);

the effluent holding tank (201) is with or without a heat exchanger (202);

the flush ratio is the ratio between volume of effluent being injected to the volume of effluent being evaporated; and the steam ratio is the quantity of heat required for the evaporation of 1 Kg of effluent.

2. The system as claimed in claim 1, wherein the plurality of pans (101) is arranged to maintain an optimized gap between the plurality of pans (101) to achieve a wind speed in a range of 5-15 m/s.

3. The system as claimed in claim 1, wherein the top surface of the plurality of pans (101) has a plurality of guiding micro channels to provide even spread of effluent for evaporation.

4. The system as claimed in claim 1, wherein the plurality of pans (101) is tilted in a direction to facilitate drainage of unevaporated effluent to a flush tank (116).

5. The system as claimed in claim 1, wherein the plurality of pans (101) has a plurality of guides (212) to guide the air flow, a plurality of spreaders (211) to spread the effluent for better evaporation, a plurality of removable blocks (214) for reducing the need for maintenance and tapered edge design (213) for reducing the obstruction to air flow.

6. The system as claimed in claim 1, wherein the plurality of nozzles (111) spray a fine mist of the effluent on the plurality of pans (101) to assure high evaporation rates.

7. The system as claimed in claim 1, wherein said control panel (208) controls injection of effluent in the apparatus (100) based on variables comprising effluent temperature, ambient air temperature and ambient humidity.

8. The system as claimed in claim 1, wherein said plurality of sensors include temperature sensor, humidity sensor, and wind speed sensor.

9. The system as claimed in claim 1, wherein optionally at least one mist separator is installed before the at least one fan duct (110) to prevent small water particles from escaping into atmosphere.

10. An apparatus (100) for maximizing evaporation of effluent liquid comprising:

a) a housing with a rear duct (109) at one end and a fan duct (110) at an end opposite to the end with the rear duct (109), b) a plurality of pans (101) positioned between the rear duct (1091 and the fan duct (110), said plurality of pans (101) arranged in at least one stack on a frame having a base with levelers and vertical and horizontal supports to hold the plurality of pans (101) in position;

c) an injection system for supplying the effluent liquid to said plurality of pans (101) from an effluent holding tank (201) in a controlled amount, and d) a control panel (208);

wherein, the fan duct comprises at least one fan;

the plurality of pans (101) have a top surface and a bottom surface, said top surface having guides and/or curvature to maintain uniform layer of effluent liquid on said top surface;

the injection system comprises an injection line (105) to guide the effluent to the plurality of pans (101), an overflow line (106) to prevent effluent from spilling over from pan and a flush line (107) to drain unevaporated effluent from the pan, said injection line comprising a plurality of nozzles to spray effluent (111);

the control panel comprises a plurality of sensors to monitor a plurality of variables, a programmable processor, an effluent management system (205) to control the level of effluent liquid in the effluent holding tank and movement of effluent liquid through said injection system, and a gateway for communication between said plurality of sensors and the effluent management system (205); and the effluent holding tank (201) is with or without a heat exchanger (202).

11. The apparatus as claimed in claim 10, wherein the plurality of pans (101) is arranged to maintain an optimized gap between the plurality of pans (101) to achieve a wind speed in a range of 5-15 m/s.

12. The apparatus as claimed in claim 10, wherein the top surface of the plurality of pans (101) has a plurality of guiding micro channels to provide even spread of effluent for evaporation.

13. The apparatus as claimed in claim 10, wherein the plurality of pans (101) is tilted in a direction to facilitate drainage of unevaporated effluent to a flush tank.

14. The apparatus as claimed in claim 10, wherein the plurality of pans (101) has a plurality of guides (212) to guide the air flow, a plurality of spreaders (211) to spread the effluent for better evaporation, a plurality of removable blocks (214) for reducing the need for maintenance and tapered edge design (213) for reducing the obstruction to air flow.

15. The apparatus as claimed in claim 10, wherein the plurality of nozzles (111) spray a fine mist of the effluent on the plurality of pans (101) to assure high evaporation rates.

16. The apparatus as claimed in claim 10, wherein said control panel (208) controls injection of effluent in the apparatus (100) based on variables comprising effluent temperature, ambient air temperature and ambient humidity.

17. The apparatus as claimed in claim 10, wherein said plurality of sensors include temperature sensors, humidity sensor, and wind speed sensor.

18. The apparatus as claimed in claim 10, wherein optionally at least one mist separator is installed before the fan duct to prevent small water particles from escaping into atmosphere.

19. An apparatus (100) for maximizing evaporation of effluent liquid comprising:
   a) a housing with a rear duct (109) at one end and a fan duct (110) at an end opposite to the end with the rear duct (109),
   b) a plurality of pans (101) positioned between the rear duct (109) and the fan duct, said plurality of pans (101) arranged in at least two adjacent stacks on a frame having a base with levelers, and a plurality of vertical and horizontal supports to hold the plurality of pans (101) in position;
   c) an injection system for supplying the effluent liquid to said plurality of pans (101) from an effluent holding tank (201) in a controlled amount; and
   d) a control panel (208);
wherein,
the fan duct comprises at least one fan;
the plurality of pans (101) have a top surface and a bottom surface, said top surface having guides and/or curvature to maintain uniform layer of effluent liquid on said top surface;
the plurality of pans (101) in one stack are at a stepped up position with respect to the plurality of pans (101) of other stack adjacent to it;
the injection system comprises an injection line (105) to guide the effluent to pan (101), an overflow line (106) to prevent effluent from spilling over from the plurality of pans (101), and a flush line (107) to drain unevaporated effluent from the plurality of pans (101), said injection line comprising a plurality of nozzles to spray effluent (111);
the control panel comprises a plurality of sensors to monitor a plurality of variables, a programmable processor, an effluent management system (205) to control the level of effluent liquid in the effluent holding tank and movement of effluent liquid through said injection system, and a gateway for communication between said plurality of sensors and the effluent management system (205); and
the effluent holding tank (201) is with or without a heat exchanger (202).

20. The apparatus as claimed in claim 19, wherein the plurality of pans (101) is arranged to maintain an optimized gap between the plurality of pans (101) to achieve a wind speed in a range of 5-15 m/s.

21. The apparatus as claimed in claim 19, wherein the top surface of the plurality of pans (101) has a plurality of guiding micro channels to provide even spread of effluent for evaporation.

22. The apparatus as claimed in claim 19, wherein the plurality of pans (101) is tilted in a direction to facilitate drainage of unevaporated effluent to a flush tank.

23. The apparatus as claimed in claim 19, wherein the plurality of pans (101) has a plurality of guides (212) to guide the air flow, a plurality of spreaders (211) to spread the effluent for better evaporation, a plurality of removable blocks (214) for reducing the need for maintenance and tapered edge design (213) for reducing the obstruction to air flow.

24. The apparatus as claimed in claim 19, wherein the plurality of nozzles (111) spray a fine mist of the effluent spray on the plurality of pans (101) to assure high evaporation rates.

25. The apparatus as claimed in claim 19, wherein said control panel (208) controls injection of effluent in the apparatus (100) based on variables comprising effluent temperature, ambient air temperature and ambient humidity.

26. The apparatus as claimed in claim 19, wherein said plurality of sensors include temperature sensor, humidity sensor, and wind speed sensor.

27. The apparatus as claimed in claim 19, wherein optionally at least one mist separator is installed before the fan duct to prevent small water particles from escaping into atmosphere.

* * * * *